United States Patent
Birze

[11] Patent Number: 5,926,537
[45] Date of Patent: Jul. 20, 1999

[54] GENERATING A DISTINCTIVE RING TONE FOR A CALLING PARTY SUBSCRIBER WITHIN A TELECOMMUNICATIONS NETWORK

[75] Inventor: Michael J. Birze, Plano, Tex.

[73] Assignee: Ericsson Inc, Research Triangle Park, N.C.

[21] Appl. No.: 08/845,940

[22] Filed: Apr. 29, 1997

[51] Int. Cl.$^6$ .......................... H04M 1/56; H04M 15/06; H04M 7/00

[52] U.S. Cl. .......................... 379/252; 379/229; 379/142

[58] Field of Search .................... 379/375, 374, 379/373, 252, 245, 246, 229, 242, 201, 142, 911

[56] References Cited

U.S. PATENT DOCUMENTS

| | | | |
|---|---|---|---|
| 4,567,323 | 1/1986 | Lottes et al. | 379/246 |
| 5,040,209 | 8/1991 | Greenberg et al. | 379/373 |
| 5,185,782 | 2/1993 | Srinivasan | 379/266 |
| 5,233,648 | 8/1993 | Nakamura | 379/233 |
| 5,491,746 | 2/1996 | Pinard | 379/373 |
| 5,608,788 | 3/1997 | Demlow et al. | 379/142 |
| 5,754,636 | 5/1998 | Bayless et al. | 379/142 |
| 5,822,404 | 10/1998 | Cave | 379/88.13 |

FOREIGN PATENT DOCUMENTS

| | | |
|---|---|---|
| 0 653 869 | 2/1994 | European Pat. Off. . |
| 60-259046 | 12/1985 | Japan . |
| 61-002464 | 1/1986 | Japan . |
| 02271777 | 11/1990 | Japan . |
| 04160966 | 6/1992 | Japan . |
| 04336753 | 11/1992 | Japan . |

OTHER PUBLICATIONS

PCT Search Report, Aug. 19, 1998, PCT/US 98/08555.

Primary Examiner—Harry S. Hong
Assistant Examiner—Benny Q. Tieu
Attorney, Agent, or Firm—Jenkens & Gilchrist

[57] ABSTRACT

In response to an incoming call connection request, a terminal type associated with a called party subscriber terminal is communicated back from a terminating exchange to an originating exchange. The originating exchange then instructs the terminating exchange to provide a particular ring tone (distinctive ring) associated with the determined terminal type over an established call connection. The terminating telecommunications then generates the instructed ring tone over the call connection and waits a predefined period of time before alerting the called party subscriber terminal. Upon hearing the distinctive ring tone, the calling party subscriber is able to ascertain the dialed terminal type (business, residential, cellular, wireline) and has an option to terminate the established call connection before the called party subscriber is alerted.

20 Claims, 3 Drawing Sheets

GENERATING A DISTINCTIVE RING TONE FOR A CALLING PARTY SUBSCRIBER WITHIN A TELECOMMUNICATIONS NETWORK

BACKGROUND OF THE INVENTION

1. Technical Field of the Invention

The present invention relates to a telecommunications network and, in particular, to the provision of a distinctive ring tone for a calling party subscriber within such a network.

2. Description of Related Art

With the introduction of Common Channel Signaling (CCS) telecommunications systems, a number of advanced telecommunications subscriber features have become available to subscribers. Using packet and non-circuit communications modes, a Signaling System No. 7 (SS7) telecommunications network utilizing the CCS standard, for example, allows two telecommunications exchanges to communicate data other than mere voice with associated telecommunications subscribers. One such subscriber feature or capability includes a calling line identification (CLI) subscriber feature.

A directory number associated with a calling party subscriber is included within a call setup signal, such as an Initial Address Message, and transported from an originating telecommunications exchange to a terminating telecommunications exchange serving a called party subscriber terminal. The terminating telecommunications exchange then extracts the included directory number and displays it at a customer premise equipment (CPE), such as a caller ID display unit, attached to the called party subscriber terminal. The called party subscriber is then able to ascertain the identity of the calling party subscriber before choosing to answer the incoming call connection. Furthermore, the terminating telecommunications exchange is also able to selectively screen incoming call connections by rejecting, accepting, or rerouting the incoming call connections depending on the directory numbers associated therewith. Accordingly, by defining an allowed list and/or disallowed list of directory numbers, the terminating telecommunications exchange is able to selectively screen incoming call connections without requiring manual interventions or instructions.

Although a number of screening or filtering subscriber features, as described above, have been introduced, the features or services have been focused mainly on the terminating side of a call connection. As a result, unless a calling party subscriber is already aware of the identity associated with a dialed directory number, the calling party subscriber remains clueless as to the identity of the called party subscriber until the call connection is answered by the called party subscriber. For example, tele-marketers wishing to sell long distance carrier service usually do not want to solicit business from non-resident customers or to bother people at work. However, not knowing what type of subscribers are associated with their potential customer directory lists, tele-marketers nonetheless have to dial each number only to find out that an associated subscription or line is a business number.

As a solution for the above problem, a calling party subscriber terminal can be equipped with a connected line identification display unit. In a manner similar to the calling line identification feature, a connected line identification presentation subscriber feature then displays, for example, the text description or name associated with a dialed directory number at the attached display unit. The calling party subscriber may then review the displayed information and ascertain the called party subscriber type. As an illustration, if the displayed text shows "ABC Inc.", the calling party subscriber may assume that the dialed number is a business number.

Such an implementation is undesirable because a call connection has already been established and the called party subscriber terminal has already been alerted (rung). Terminating the call connection abruptly thereafter by hanging-up the phone might, for example, further irritate or bother the called party subscriber. It further requires the calling party subscriber terminal to be equipped with a special display unit and means for communicating such data with the originating telecommunications exchange in speech mode. Moreover, other than from the displayed text description, such an implementation still fails to inform the calling party subscriber whether the called party subscriber terminal is associated with a wireline, wireless, residential, or business number.

Accordingly, there is a need for a mechanism to enable an originating telecommunications exchange to ascertain the subscription type associated with a called party subscriber terminal and to inform a calling party subscriber associated thereto.

SUMMARY OF THE INVENTION

The present invention discloses a method and apparatus for providing a distinctive ring tone to a calling party subscriber terminal originating a call connection towards a called party subscriber terminal. A terminating telecommunications exchange serving the called party subscriber terminal receives an incoming call connection from an originating telecommunications exchange serving the calling party subscriber terminal. After determining that the originating telecommunications exchange is requesting a distinctive ring tone, the terminating telecommunications exchange ascertains the terminal type associated with the called party subscriber terminal. The ascertained terminal type is then communicated back to the originating telecommunications exchange. The originating telecommunications exchange then identifies an appropriate ring tone to be applied over the connected call connection and communicates data indicative of the determined ring tone back to the terminating telecommunications exchange. A tone generator associated with the terminating telecommunications exchange then generates the ring tone indicated by the originating telecommunications exchange over the received incoming call connection. The called party subscriber terminal is further alerted to effectuate a speech connection with the calling party subscriber terminal.

In one embodiment of the present invention, a first timer is set after communicating the ascertained terminal type from the terminating telecommunications exchange to the originating telecommunications exchange. When the tone type is not received from the originating telecommunications exchange before the first timer expires, the terminating telecommunications exchange effectuates a speech connection with the called party subscriber by alerting the called party subscriber terminal of the received incoming call connection in a conventional manner.

As another embodiment of the present invention, a second timer is set after generating the indicated ring tone over the received incoming call connection. The terminating telecommunications exchange then delays alerting the called party subscriber terminal until the second timer expires to allow the calling party subscriber to hear the generated tone and to terminate the call connection without alerting the called party subscriber terminal.

As yet another embodiment of the present invention, after communicating the ascertained terminal type back to the originating telecommunications exchange, the terminating telecommunications exchange marks the line status associated with the called party subscriber terminal as busy. Such a marking prevents other incoming call connections towards the called party subscriber terminal from terminating while the originating telecommunications exchange is being informed of the ascertained terminal type.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
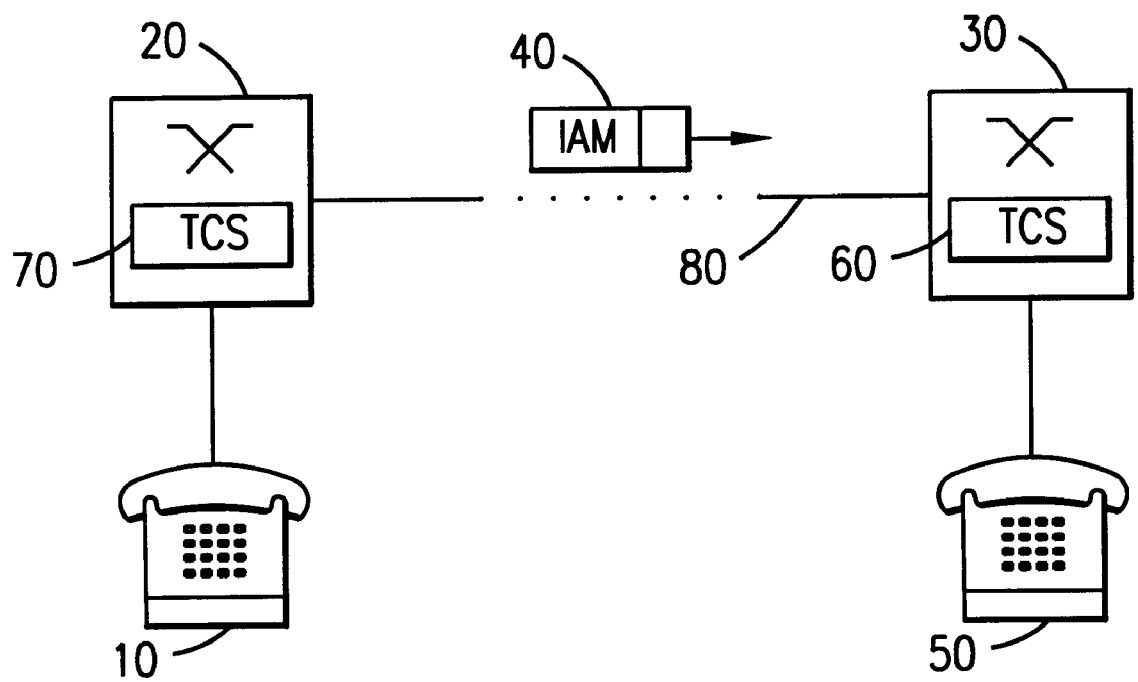
FIG. 1 is a block diagram of a telecommunications network illustrating the establishment of a call connection between a calling party subscriber terminal and a called party subscriber terminal.

FIG. 1 is a block diagram of a telecommunications network illustrating the establishment of a call connection between a calling party subscriber terminal 10 and a called party subscriber terminal 50. The calling party subscriber terminal 10 is being served by an originating telecommunications exchange (switch) 20 and the called party subscriber terminal 50 is similarly being served by a terminating telecommunications exchange 30. A first traffic control system (TCS) 70 associated with the originating telecommunications exchange 20, for example, collects the digits dialed by the calling party subscriber terminal 10 and originates a call setup signal, such as an Integrated Service Digital Network User Part (ISUP) based Initial Address Message (IAM) 40, over a connected Signaling System No. 7 (SS7) telecommunications network. The IAM 40 message specifies the directory number identifying the called party subscriber terminal 50 as the called party number. The message 40 is then routed from the originating telecommunications exchange 20 to the terminating telecommunications exchange 30. A circuit connection 80 is accordingly established therebetween. A second traffic control system 60 associated with the terminating telecommunications exchange 30 then receives the transmitted IAM signal 40 and extracts the directory number representing the called party subscriber terminal enclosed therein. After performing, for example, a B-number analysis to identify a particular line circuit associated with the called party subscriber terminal 50, the second TCS 60 determines whether the identified subscriber terminal is currently busy. Where the called party subscriber line is idle, the received incoming call connection is allowed to be terminated towards the identified called party subscriber terminal. As a result, a ring tone is generated within the terminating telecommunications exchange 30 and transported to the calling party subscriber terminal 10 over the established call connection 80. The ring tone is generated by the terminating telecommunications exchange 30 since a call connection has already been established and is able to transport the generated tone to the calling party subscriber terminal 10. Concurrently, the called party subscriber terminal 50 is further alerted (rung) to inform the called party subscriber of the received incoming call connection 80. In response to the called party subscriber answering the phone, a speech connection is effectuated between the two parties.

Where the called party subscriber terminal is currently busy, the associated second TCS 60 determines whether the called party subscriber has a terminating subscriber feature, such as a call waiting or call forwarding, activated. As an illustration, for an already busy called party subscriber with call waiting activated, the calling party subscriber terminal still hears the ring tone in a conventional manner and the called party subscriber hears an intrusion (call waiting) tone over an existing speech connection. The called party subscriber then has an option to flash and to answer the call waiting. For an already busy called party subscriber with a call forward on busy (CFB) subscriber feature activated, the second TCS 60 and associated application modules (not shown in FIG. 1) retrieve a forward-to-directory-number predefined by the called party subscriber and forwards the received incoming call connection 80 to the retrieved forward-to-number.

Where the busy called party subscriber terminal 50 has no subscriber feature activated to accommodate the received incoming call connection, the received incoming call connection is rejected or released, and a busy signal is returned back to the originating telecommunications exchange 20. The originating telecommunications exchange 20 then generates a busy tone to the calling party subscriber terminal 10 informing the calling party subscriber of the busy line status associated with the called party subscriber terminal 50. In contrast to the provision of the ring tone, the busy tone is generated by the originating telecommunications exchange since there no longer exists a call connection 80 between the two serving telecommunications exchanges to transport such a tone.

Figure 2:
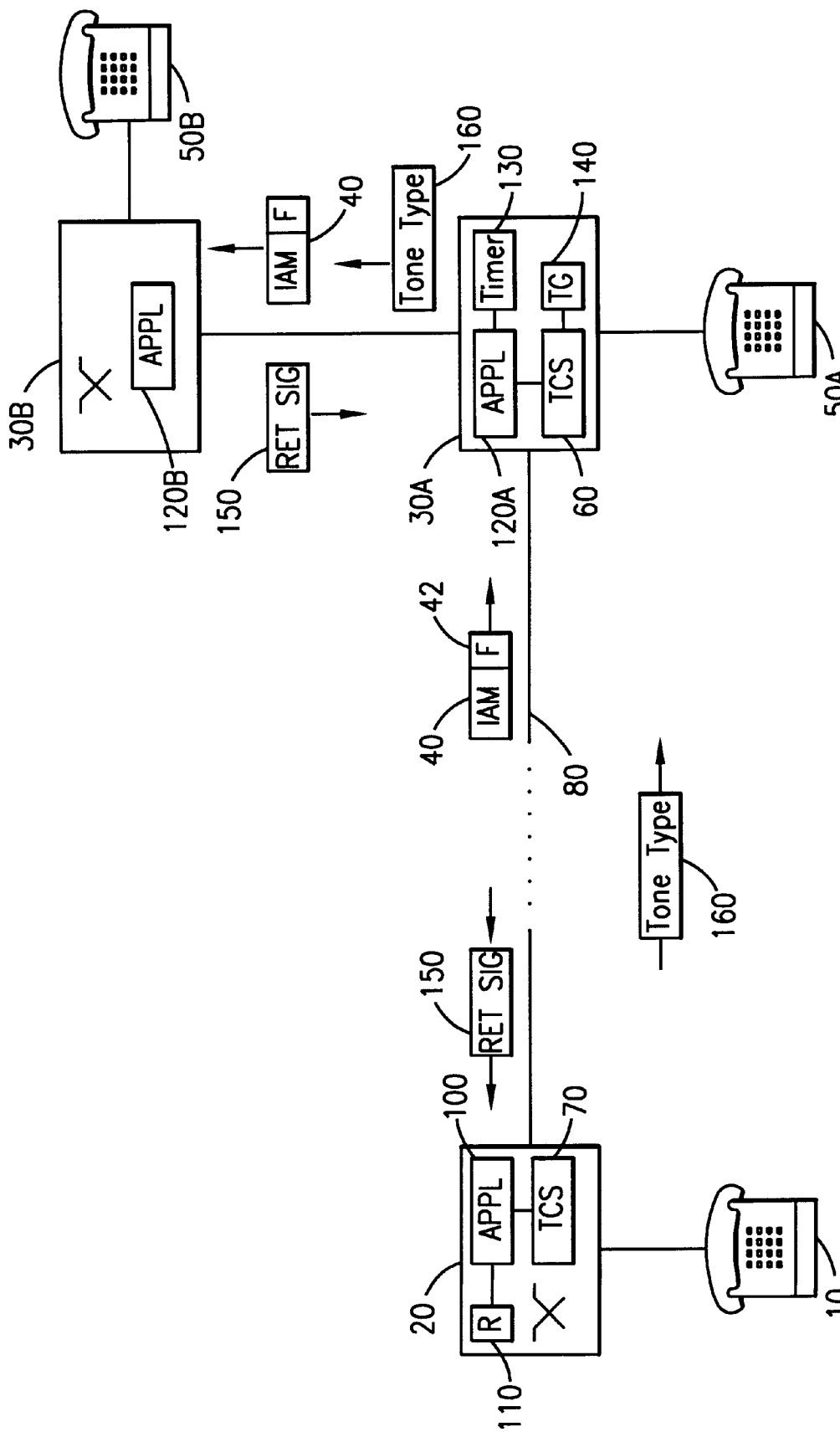
FIG. 2 is a block diagram of a telecommunications network illustrating the provision of a distinctive ring tone from a terminating telecommunications exchange towards a calling party subscriber terminal in accordance with the teachings of the present invention.

FIG. 2 is a block diagram of a telecommunications network illustrating the provision of a distinctive ring tone from a terminating telecommunications exchange towards a calling party subscriber terminal in accordance with the teachings of the present invention. The calling party subscriber terminal 10 has a distinctive ring tone subscriber feature activated. In response to an indication to originate an outgoing call connection towards a called party subscriber terminal 50A, a first application module 100 associated with the originating telecommunications exchange 20 determines that the distinctive ring tone subscriber feature is activated therewith. The first application module 100 then includes a flag (F) 42 within a call setup signal indicating that the distinctive ring tone is requested on the calling party subscriber terminal. For example, a parameter 42 within an Initial Address Message (IAM) signal 40 includes data indicating that the distinctive ring tone is requested. The first application module 100 then transmits the IAM signal 40 via the first TCS 70 over the connected SS7 signaling link.

As a result, an incoming call connection 80 is established between the originating telecommunications exchange 20 and a first terminating telecommunications exchange 30A serving the called party subscriber terminal 50A. A second TCS module 60 associated with the first terminating telecommunications exchange 30A then receives the transmitted IAM signal 40 and determines that the distinctive ring tone is requested from the originating telecommunications exchange 20. In response, a second application module 120A associated with the first terminating telecommunications exchange 30A ascertains the type of subscriber terminal or subscription associated with the called party subscriber terminal 30A. As an illustration, a determination is made as to whether the called party subscriber terminal is a business, residential, or governmental number. Similarly, a determination can be made as to whether the dialed number is a cellular or wireline number. After making such a determination, the second application module 120A transmits a determined type return signal 150 back to the originating telecommunications exchange 20. Such a determined type return signal may include an Integrated Service Digital Network User Part (ISUP) signal, such as a Backward Call Indicator signal. Alternatively, such data may be transported using a Transaction Capability Application Part (TCAP) based signal.

Furthermore, a timer 130 with a predefined timer value is activated after the transmission of such a signal from the first terminating telecommunications exchange 30A. Such a timer is utilized to specify a period of time in which a response to the signal 150 is expected from the originating telecommunications exchange. When the expected response signal containing an appropriate tone type is not received before the timer expires, the receiving incoming call connection is allowed to terminate towards the called party subscriber terminal in a conventional manner. Accordingly, the calling party subscriber hears a normal ring tone.

In order to prevent other incoming call connections from seizing the called party subscriber terminal 50A while the second application module 120A is waiting for the response from the originating telecommunications exchange 20, the line status associated with the called party subscriber terminal 50A within the first terminating telecommunications exchange 30A is marked as busy. Consequently, the called party subscriber terminal 50A and associated line circuit is reserved by the first terminating telecommunications exchange 30A for the calling party subscriber terminal 10 and the established call connection 80 associated therewith.

The first application module 100 associated with the originating telecommunications exchange 20 then receives the determined terminal type return signal 150 transmitted by the first terminating telecommunications exchange 30A. The transmitted signal may include the real directory number associated with the called party subscriber terminal and the type of subscriber terminal. Such a real directory number may be different from the dialed directory number if the dialed number has been transformed during call establishment. For example, such a transformation occurs in the United States with toll free numbers (800 numbers). The first application module 100 then compares the received data with category data stored at an associated register (R) 110 and determines which type of ring tone needs to be generated for this particular call connection. The category data may be previously defined and stored at the register (R) 110 by the calling party subscriber and/or an associated service provider. As described above, such a tone may be associated with different types of terminals, networks (cellular vs wireline), and directory numbers. Correlation with such a directory number may further be made for each specific directory number, or group of directory numbers (e.g., NPA-NXX group).

Since the ring tone needs to be generated by the terminating telecommunications exchange in a conventional manner, the determined tone type is then communicated back to the first terminating telecommunications exchange 30A via yet another Signaling Connection Control Part (SCCP) based signal 160. Such a SCCP based signal 160 includes a TCAP or Intelligent Network Application Part (INAP) based signal.

The second application module 120A receives the transmitted tone type signal 160 from the originating telecommunications exchange 20, deactivates the timer 130, and generates the indicated ring tone (distinctive ring tone) over the established incoming call connection 80 using an associated tone generator (TG) 140. As a result, the calling party subscriber hears the recognizable distinctive ring tone and is able to ascertain the type of called party subscriber terminal. The calling party subscriber 10 may then realize that a business number, for example, has been dialed and terminate the call connection.

In order to enable the calling party subscriber to terminate the established call connection 80 without alerting the called party subscriber terminal 50A, the timer 130 is again activated for a predefined time period after the generation of the indicated tone over the call connection 80. Alerting (ringing) the called party subscriber terminal 50A is then delayed until the timer 130 expires to allow ample time for the calling party subscriber to hear the generated tone and to possibly terminate the call connection 80 without alerting or bothering the called party subscriber terminal 50A.

As another illustration of the present invention, the calling party subscriber hears a particular distinctive ring tone associated with the called party subscriber's terminal type as fully described above for a particular call connection. In the case that the called party subscriber has a call forwarding on don't answer (CFDA) subscriber feature activated and the called party subscriber fails to answer the incoming call connection within a predefined number of ring cycles, the established incoming call connection 80 is accordingly rerouted by the second TCS 60 to a designated forward-to-number. For example, the called party subscriber has designated a forward-to-subscriber terminal 50B associated with a second terminating telecommunications exchange 30B as the forward-to-number. Accordingly, the alerting on the called party subscriber terminal 50A is terminated and the established call connection 80 is rerouted from the first terminating telecommunications exchange 30A to the second terminating telecommunications exchange 30B. While rerouting the received incoming call connection to the second terminating telecommunications exchange 30B, the distinctive ring tone flag originally received within the first call setup signal is further included within the newly transmitted call setup signal towards the second terminating telecommunications exchange 30B. A third application module 120B associated with the second terminating telecommunications exchange 30B then performs a similar function as fully described above and provides the originating telecommunications exchange 20 with data indicating the terminal type associated with the forward-to-subscriber terminal 50B. The first application module 100 associated with the originating telecommunications exchange 20 then similarly instructs the new terminating telecommunications exchange to generate an appropriate tone over the newly established call connection.

Consequently, if the forward-to-subscriber terminal is associated with a different terminal type than the called party subscriber terminal 50A, the first application module 100 instructs the second terminating telecommunications exchange 30B to generate a different ring tone over the rerouted call connection. As a result, the calling party subscriber may sequentially hear two different types of ring tones as the outgoing call connection is first established with the first terminating telecommunications exchange 30A for the called party subscriber terminal 50A and then later with the second terminating telecommunications exchange 30B for the forward-to-subscriber terminal 50B. The calling party subscriber is then able to terminate the call connection as the circuit connection is forwarded from a residential terminal to a business terminal.

Figure 3:
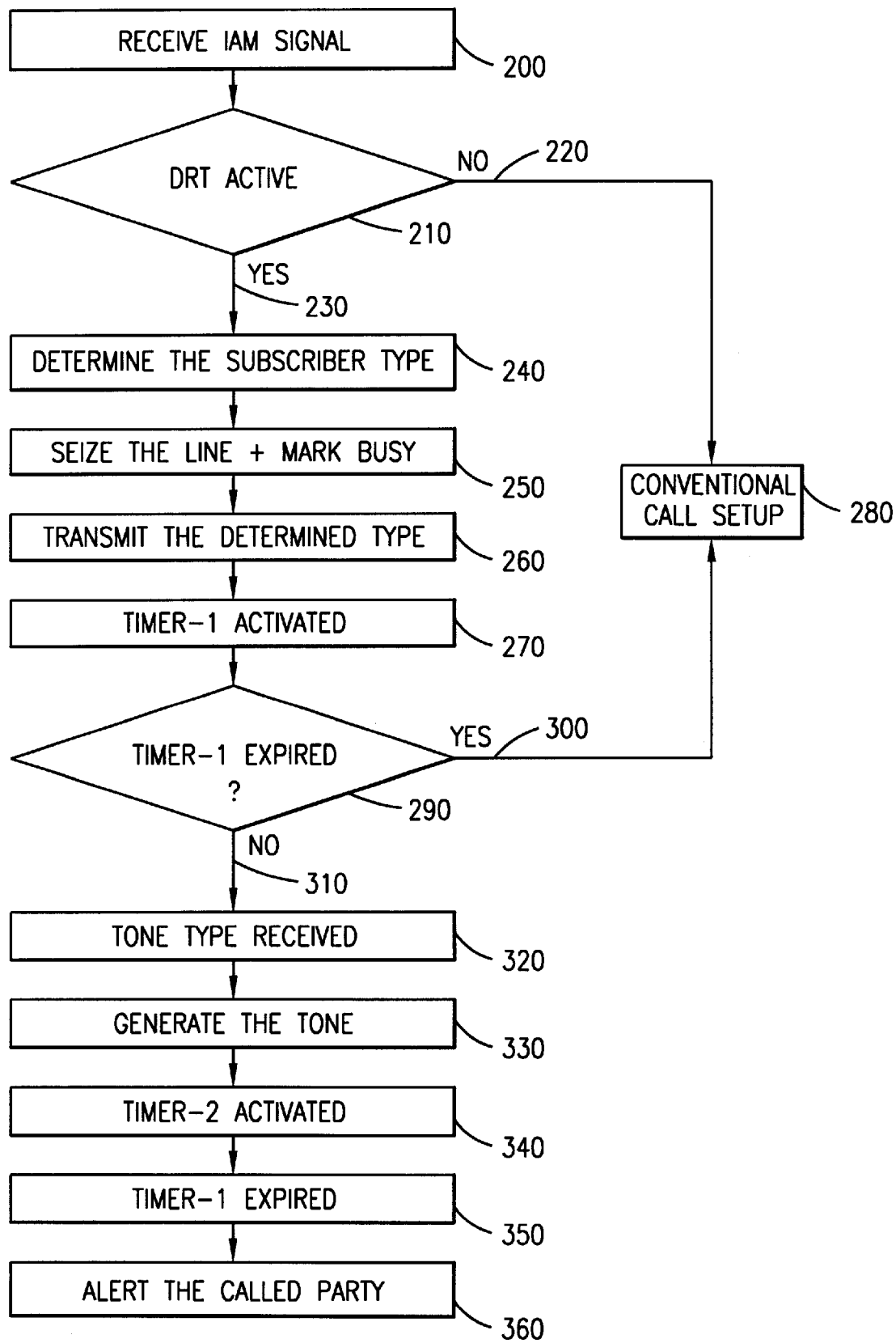
FIG. 3 is a flowchart describing the steps performed by a terminating telecommunications exchange to provide a distinctive ring tone to a calling party subscriber terminal in accordance with the teachings of the present invention.

FIG. 3 is a flowchart describing the steps performed by a terminating telecommunications exchange to provide a distinctive ring tone to a calling party subscriber terminal in accordance with the teachings of the present invention. A terminating telecommunications exchange or switch receives an IAM signal to effectuate a call connection toward a particular called party subscriber associated thereto at step 200. A traffic control system (TCS) module associated within the terminating telecommunications exchange then determines at step 210 whether a flag indicating that the originating telecommunications exchange is requesting a distinctive ring tone is set within the received call setup signal. In response to a negative determination (No decision link 220), a normal call connection is effectuated with the called party subscriber terminal at step 280. As a result, the calling party subscriber terminal hears a normal ring tone and the called party subscriber terminal is alerted concurrently therewith.

On the other hand, in response to an affirmative determination (Yes decision link 230), an application module associated with the terminating telecommunications exchange determines the terminal type associated with the called party subscriber terminal at step 240. Such a terminal type may indicate whether the called party is a business, residential, cellular, wireline, etc. The application module then identifies the line circuit associated with the called party subscriber terminal and seizes the line circuit by marking the line status as busy at step 250. The application module further transmits a signal including the determined terminal type to the originating telecommunications exchange at step 260. After the transmission of the signal informing the originating telecommunications exchange of the terminal type associated with the called party subscriber terminal, the application module further activates a timer for a predefined period of time at step 270. A next determination is then made at step 290 to ascertain whether a response signal containing a tone type is received from the originating telecommunications exchange before the timer expires at step 290. In the case that the timer expires without receiving the expected response signal (Yes decision link 300), the application module instructs the associated TCS module to effectuate a normal call connection in a conventional manner at step 280.

If the response signal containing the appropriate tone type is received (No decision link 310) from the originating telecommunications exchange before the timer expires at step 320, the application module instructs an associated tone generator to generate the tone indicated by the received tone data at step 330. The generated tone is then transported over the established circuit connection between the two exchanges and heard by the calling party subscriber. The calling party subscriber is then able to ascertain the terminal type associated with the called party subscriber in accordance with the teachings of the present invention. After the generation of the tone, the application module further activates another timer at step 340. The application module waits for the timer to expire before alerting the called party subscriber terminal to allow ample time for the calling party subscriber to hear the generated tone and to possibly terminate the call connection before alerting the called party subscriber terminal at step 350.

However, if a release signal from the originating telecommunications exchange is not received until the timer expires, the application module then instructs the associated TCS module to alert the called party subscriber terminal and effectuate a speech connection with the calling party subscriber terminal at step 360.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for establishing a call connection between a calling party subscriber being served by an originating telecommunications switch and a called party subscriber being served by a terminating telecommunications switch, said method comprising the steps of:

receiving an incoming call connection at said terminating telecommunications switch, said incoming call connection originated by said calling party subscriber associated with said originating telecommunications switch;

determining the type of a subscriber terminal associated with said called party subscriber;

informing said originating telecommunications switch of said determined subscriber terminal type;

receiving data indicative of a tone associated with said determined subscriber terminal type to be generated by said terminating telecommunications switch towards said originating telecommunications switch;

generating said tone towards said calling party subscriber over said received incoming call connection; and establishing said call connection between said calling party subscriber and said called party subscriber by alerting a called party subscriber terminal associated with said called party subscriber of said incoming call connection.

2. The method of claim 1 wherein said step of informing said originating telecommunications switch of said determined subscriber terminal type further comprises the steps of:

setting a timer for a predefined amount of time; and when said data indicative of said tone to be generated are not received from said originating telecommunications switch before said timer expires, terminating said incoming call connection towards said called party subscriber terminal using a normal tone.

3. The method of claim 1 wherein said type of subscriber terminal comprises a terminal associated with a business subscription.

4. The method of claim 1 wherein said type of subscriber terminal comprises a terminal associated with a cellular subscription.

5. The method of claim 1 wherein said type of subscriber terminal comprises a terminal associated with a residential subscription.

6. The method of claim 1 wherein said step of generating said tone towards said calling party subscriber over said received incoming call connection further comprises the steps of:

setting a timer for a pre-defined amount of time; and alerting said called party subscriber terminal after said timer expires.

7. The method of claim 1 wherein said step of informing said originating telecommunications switch of said determined subscriber terminal type further comprises the step of marking said called party subscriber terminal busy within said terminating telecommunications switch.

8. A method for providing a distinctive ringing tone towards a calling party subscriber terminal while establishing a call connection towards a particular called party subscriber terminal, said called party subscriber terminal associated with a particular terminal type, said method comprising the steps of:

originating a call setup signal from an originating telecommunications exchange serving said calling party subscriber terminal to a terminating telecommunications exchange serving said called party subscriber terminal, said originated call setup signal requesting a call connection between said calling party subscriber terminal and said called party subscriber terminal;

receiving first data indicating the type of subscriber terminal associated with said called party subscriber terminal from said terminating telecommunications exchange;

determining the type of ringing tone said originating telecommunications exchange desires to generate towards said calling party subscriber terminal; and transmitting second data indicative of said determined tone type to said terminating telecommunications exchange, said second signal instructing said terminating telecommunications exchange to generate said determined tone over a call connection established between said originating telecommunications exchange and said terminating telecommunications exchange.

9. The method of claim 8 wherein said call setup signal includes a flag instructing said terminating telecommunications exchange to provide said subscriber terminal type associated with said called party subscriber terminal.

10. The method of claim 8 wherein said originating telecommunications exchange stores a data table storing a plurality of subscriber terminal types, said data table further correlating each of said plurality of subscriber terminal types with an associated tone type, wherein said step of determining said type of ringing tone further comprises the step of comparing said first data against said data table to ascertain said associated tone type.

11. The method of claim 8 wherein said originating telecommunications exchange stores a data table storing a plurality of subscriber directory numbers, said data table further correlating each of said plurality of subscriber directory numbers with an associated tone type, wherein said step of determining said type of ringing tone further comprises the step of comparing a directory number associated with said called party subscriber terminal against said data table to ascertain said associated tone type.

12. The method of claim 8 wherein said call setup signal comprises an Integrated Service Digital Network User Part (ISUP) based Initial Address Message (IAM).

13. The method of claim 8 wherein said second data are transmitting using a Transaction Capabilities Application Part (TCAP) signal.

14. A telecommunications exchange for establishing an incoming call connection towards a called party subscriber terminal, said incoming call connection originated by an originating telecommunications exchange serving a calling party subscriber terminal, said telecommunications exchange comprising:

a traffic control module for receiving said incoming call connection;

an application module associated with said traffic control module for:

determining that a distinctive ringing is requested for said incoming call connection from said calling party subscriber;

determining the type of subscriber terminal associated with said called party subscriber terminal;

transmitting said determined type to said originating telecommunications exchange; and receiving data indicative of a tone type to be generated over said incoming call connection towards said calling party subscriber terminal from said originating telecommunications exchange;

a tone generator for generating said indicated tone type over said incoming call connection over said incoming call connection; and wherein said traffic control module alerting said called party subscriber terminal of said received incoming call connection.

15. The telecommunications exchange of claim 14 further comprising a first timer set with a predefined time wherein said first timer is activated when said application module transmits said determined type to said originating telecommunications exchange and in case said data indicative of said tone type is not received before said first timer expires, said traffic control module alerts said called party subscriber terminal.

16. The telecommunications exchange of claim 15 further comprising a second timer set with a predefined time wherein said second timer is activated when said tone generator generates said indicated tone type to said calling party subscriber terminal and said traffic control module alerts said called party subscriber terminal after said second timer expires.

17. A terminating telecommunications switch for providing a distinctive ring tone towards a calling party subscriber terminal while establishing a call connection towards a called party subscriber terminal, said calling party subscriber terminal being served by an originating telecommunications switch and said called party subscriber terminal being served by said terminating telecommunications switch, said terminating telecommunications switch comprising:

means for receiving an incoming call connection from said originating telecommunications switch towards said called party subscriber terminal;

means for determining the type of a subscriber terminal associated with said called party subscriber terminal;

means for communicating said determined type to said originating telecommunications switch;

means for receiving data indicative of a tone type desired by said originating telecommunications switch for said calling party subscriber terminal; and means for generating said indicated tone over said received incoming call connection towards said calling party subscriber.

18. The terminating telecommunications switch of claim 17 further comprising a timer device for waiting a predefined amount of time before alerting said called party subscriber terminal of said received incoming call connection.

19. The terminating telecommunications switch of claim 17 further comprising:

a timer device for waiting a predefined amount of time after communicating said determined type to said originating telecommunications switch; and means for alerting said called party subscriber if said data are not received from said originating telecommunications switch before said timer expires.

20. The terminating telecommunications switch of claim 17 further comprising means for marking said called party subscriber terminal busy after determining said terminal type.

* * * * *